United States Patent [19]

Cage

[11] Patent Number: 4,895,031

[45] Date of Patent: Jan. 23, 1990

[54] SENSOR MOUNTING FOR CORIOLIS MASS FLOW RATE METER

[75] Inventor: Donald Cage, Longmont, Colo.

[73] Assignee: Micro Motion Inc., Boulder, Colo.

[21] Appl. No.: 226,554

[22] Filed: Aug. 1, 1988

Related U.S. Application Data

[63] Continuation of Ser. No. 770,590, Aug. 29, 1985, abandoned.

[51] Int. Cl.⁴ ............................................... G01F 1/84
[52] U.S. Cl. .................................................. 73/861.38
[58] Field of Search .......................... 73/861.37, 861.38

[56] References Cited

U.S. PATENT DOCUMENTS

| | | | |
|---|---|---|---|
| 2,635,462 | 4/1953 | Poole et al. | 73/23 A |
| 3,039,310 | 6/1962 | Copland et al. | 73/434 |
| 3,187,584 | 6/1965 | Hudson | 73/434 |
| 3,330,161 | 7/1967 | Whitehead | 73/434 |
| 3,355,944 | 12/1967 | Sipin | 73/194 |
| 3,449,940 | 6/1969 | Banks | 73/32 |
| 3,449,941 | 6/1969 | Banks | 73/32 |
| 3,485,098 | 12/1969 | Sipin | 73/194 |
| 3,541,863 | 11/1970 | Barron et al. | 73/434 |
| 3,812,723 | 5/1974 | Barron | 73/434 |
| 3,816,776 | 6/1974 | Chari | 310/13 |
| 3,981,183 | 9/1976 | Banks | 73/61.1 R |
| 4,381,680 | 5/1983 | Shiota | 73/861.38 |
| 4,491,025 | 1/1985 | Smith et al. | 73/861.38 |
| 4,660,421 | 4/1987 | Dahlin et al. | 73/861.38 |

FOREIGN PATENT DOCUMENTS 0125622  10/1981  Japan ................................ 73/861.38

*Primary Examiner*—Herbert Goldstein

[57] ABSTRACT

A Coriolis mass flow meter apparatus for determining the mass flow rates of fluids passed through twin flow tubes which are oscillated by a driver in a tuning fork fashion so as to be distorted by the mass flow rate of the fluid passing through the tubes with the distortion measured by sensors; where, sensor and driver components are mounted to each of the flow tubes so that the masses of the components and the structures used to mount the components to the flow tubes results in a center of gravity which is located on the axes about which each flow tube is distorted by generated Coriolis forces.

7 Claims, 4 Drawing Sheets

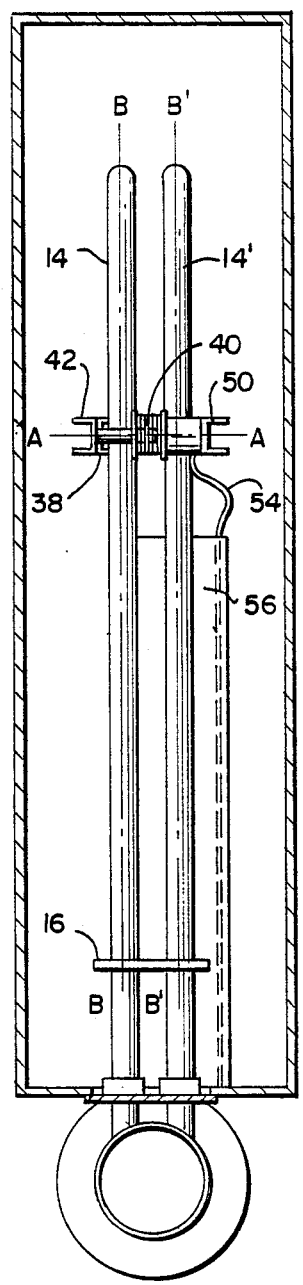
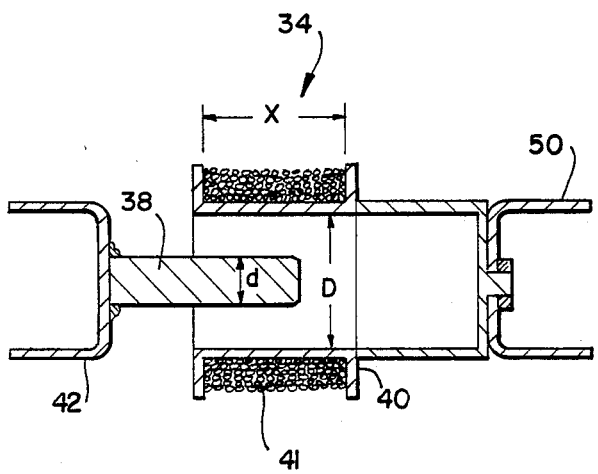
FIG 3
FIG 5

SENSOR MOUNTING FOR CORIOLIS MASS FLOW RATE METER

This application is a continuation of application Ser. No. 770,590, filed Aug. 29, 1985, now abandoned.

BACKGROUND OF THE INVENTION

In the art of measuring mass flow rates of flowing substances it is known that flowing a fluid through a rotating or oscillating conduit induces Coriolis forces which act perpendicularly to both the velocity of the mass moving through the conduit and the angular velocity vector of the rotating or oscillating conduit. It is also known that the magnitudes of such Coriolis forces are related to both the mass flow rate passing through the conduit and the angular velocity of the conduit.

One of the major technical problems previously associated with efforts to design and make Coriolis mass flow rate instruments was the necessity either to measure accurately or control precisely the angular velocity of the conduit so that the magnitude of generated Coriolis forces could be determined and, therefrom, one could calculate the mass flow rate of the substance flowing through the conduit. Even if the angular velocity of the flow conduit could be determined or controlled, accurate determination of the magnitude of generated Coriolis forces was another technical problem previously associated with designing and making Coriolis mass flow rate instruments. This problem arises in part because the magnitude of generated Coriolis forces are very small, therefore resulting distortions of flow conduits which are oscillating or rotating are minute. Further, because of the small magnitude of the Coriolis forces, distortions of the conduit resulting from external sources such as invariably present vibrations induced, for example, by neighboring machinery or pressure surges in fluid lines cause erroneous determinations of mass flow rates. Such error sources may even completely mask the effects caused by generated Coriolis forces rendering the meter useless.

A mechanical configuration and measurement technique which, among other advantages: (a) avoids the need to measure or control the magnitude of the angular velocity of a Coriolis mass flow rate instrument's flow sensing conduit; (b) concurrently provides requisite sensitivity and accuracy for the measurement of effects caused by generated Coriolis forces; and, (c) is not susceptible to errors resulting from external vibration sources, is taught in U.S. Pat. Nos. Re 31,450, 4,422,338 and 4,491,025. The mechanical configuration disclosed in these patents incorporates curved flow sensing conduits which have no pressure sensitive sections, such as bellows or other pressure deformable portions The curved flow sensing conduits are solidly cantilever mounted from the inlet and outlet parts of the conduits, e.g. welded or brazed, so that the conduits can be oscillated in springlike fashion about axes which are located near the solidly mounted sections of the conduits. By further designing the mounted curved flow conduits so that they have resonant frequencies about the axes located near the solid mountings which are lower than the resonant frequencies about the axis which Coriolis forces act, a mechanical situation arises whereby the forces opposing generated Coriolis forces are predominantly linear spring forces. Oscillation of such a solidly mounted curved flow conduit while fluid is flowing through the flow conduit results in the generation of a Coriolis force couple. This Coriolis force couple is generated in two portions of the continuous flow conduit, to wit the portion where there is a velocity component of the fluid through the conduit directed toward the angular velocity vector, and the portion where there is a fluid velocity component directed away from the angular velocity vector. The Coriolis force couple opposed by linear spring forces twists or torques the curved conduit about an axis between the portions of the continuous flow conduit in which Coriolis forces are generated. The magnitude of the twisting or torquing is a function of the magnitudes of the generated Coriolis forces and the linear spring forces opposing the generated Coriolis forces.

The flow conduit in addition to being twisted by Coriolis forces is also being driven in oscillation. Accordingly, one of the portions of the continuous flow conduit on which the Coriolis forces are acting will be twisted so as to lead, in the direction in which the flow conduit is moving, and the other portion on which Coriolis forces are acting will be twisted so as to follow the first flow conduit section. The amount of time required for the twisted sections of the oscillating flow conduit to pass preselected points is a linear function of the mass flow rate of the fluid passing through the flow conduit. The relationship between the measured time and the mass flow rate passing through the flow conduit is only dependent on constants derived from the mechanics of the continuous flow conduit and its solid mounting. This relationship is not dependent on other variables which must be measured or controlled. Optical sensors are specifically described in U.S. Pat. No. Re 31,450 and electromagnetic velocity sensors are specifically described in U.S. Pat. Nos. 4,422,338 and 4,491,025 for making the required time measurements from which mass flow rates can be determined.

A double flow conduit embodiment with sensors for making the necessary time measurements is specifically described in U.S. Pat. No. 4,491,025. The double flow conduit embodiment described in U.S. Pat. No. 4,491,025 provides a Coriolis mass flow rate instrument configuration which is operated in a tuning fork manner as described in U.S. reissue Pat. No. Re 31,450. The tuning fork operation contributes to minimizing effects of external vibration forces. Minimizing effects of external vibration forces is important because these forces can induce errors in the required time measurement. This embodiment also provides for accurate determinations of fluid mass flow rates without being limited by vibrational forces which can be transmitted through the support where the flow conduits are solidly mounted. The vibrational forces transmitted through the support which are of concern here are those caused by the oscillation of the flow conduits. As the mass of flow conduits increase, the forces transferred to the support by oscillating the conduits similarly increase. Because the flow conduits are configured in, and oscillated in, a tuning fork arrangement, the forces arising in the support are of equal magnitude. The forces are directed predominantly against each other and therefore cancel.

The support for an instrument can include multiple structures as taught in U.S. Pat. No. 4,491,025. In addition to welding or brazing the flow conduits to a first support structure, spacer bars, such as metal plates, can also be welded or brazed to adjacent portions of twin flow conduit embodiments at essentially equal distances from the first support structure. The combination of welding or brazing the flow conduits to the first support structure and to spacer bars results in an increase in the length of the flow conduit over which stress caused by oscillating the conduit is concentrated. This effective increase in the length of the flow conduit decreases the strain experienced by the flow conduit and therefore provides a configuration which is less likely to produce cracks in oscillating flow conduits The use of spacer bars also results in movement away from the first support structure of the axis about which the flow conduits are oscillated.

SUMMARY OF THE INVENTION

The necessity for generating angular velocity vectors about flow conduits of Coriolis mass flow rate instruments can result in unbalanced operation of the instruments. Oscillations of flow conduits will, if the flow conduits are not dynamically balanced, produce forces, both torque and translational, which can excite modes of oscillation in flow meter structures or couple oscillatory energy to other modes that introduce error signals in the determination of mass flow rates. Forces generated by oscillation of flow conduits must be either cancelled by opposing forces or effectively dampened at the locations where the flow conduits are mounted. Without due consideration to such problems in designing Coriolis mass flow rate instruments, impractical and even totally useless designs for attempting to measure mass flow rates can result.

Previously known designs for building dynamically balanced Coriolis mass flow rate meters include mounting two flow conduits, or one flow conduit and a dynamically matching spring structure, in essentially parallel fashion and driving them in oscillation, but 180° out of phase with each other, so that the two flow conduits, or one flow conduit and matching spring structure, oscillate as the tines of a tuning fork; see U.S. Pat. Nos. Re 31,450, 4,192,128, 4,311,054 and 4,491,025. Such oscillation of two structures can result in the generation at the mounting points of the respective paired structures of forces which are both equal and opposite in direction. The effectiveness of these designs is exemplified, inter alia, by commercial Coriolis mass flow rate meters built in conformity with U.S. Pat. No. 4,491,025 which provide accurate measurements to ±0.4% of mass flow rate. Measurements of fluid mass flow at such accuracies had not been achievable with commercial equipment previous to the introduction of devices described and claimed in Re. 31,450.

Ideally dynamic balancing of the two flow conduit configurations requires both flow conduits to have essentially identical spring constants and to have essentially identical rotational inertia about the axes from which the flow conduits are oscillated. This condition was substantially approximated in the above-mentioned commercial equipment using essentially identically shaped flow conduits of the same weight and made from the same material without considering in detail the contributions to rotational inertia of the mechanisms attached to the flow conduits. Such attached mechanisms included the drive mechanism for exciting the flow conduits into oscillation and the sensor systems used to measure Coriolis force induced effects. The contributions to rotational inertia of attachments to flow conduits were heretofore deemed not consequential, in part, because the attachments were symmetrically mounted. The drive mechanism was mounted at a location essentially halfway between the sections of the flow conduit in which the Coriolis forces are generated and each of two sensor systems was mounted at an essentially symmetrical location with respect to the other on each of the sections of the flow conduit where Coriolis forces act. Such mounting of attachments to flow conduits, however, has now been found not to provide ultimate dynamic balancing because the positioning of the drive mechanisms or sensor systems on a flow conduit can create centers of gravity which are displaced from the flow conduit so that a primary mode of oscillation would exist where the attached mass oscillates about the flow conduit causing flexure in torsion. In the known commercial meters referred to above, therefore, oscillations of attached mechanisms about the flow conduit, for example the sensor systems, can cause some error in measured signals. Generation of unequal forces at the base of oscillating flow has also been encountered when the centers of gravity for attached mechanisms on one of the flow conduits are not at the same distance from the axis about which the flow conduit is oscillated as the centers of gravity of mechanisms forces have been found to vibrate the meter structure so that many modes of oscillation can be excited.

For many commercial applications the magnitude of the unbalanced forces caused by such mounting of sensors and drive mechanisms is negligible in comparison to the substantial forces caused by the oscillation of the much more massive flow conduits. For others, where greater accuracy of mass flow measurements is a consideration, the present invention supplies more nearly ideal dynamic balancing and thus enables greater precision and accuracy than heretofore attained with meters of the same general type.

In the present invention, the components of the drive mechanism and sensor systems which are mounted from each flow conduit are attached to straight beam structures. The beam structures are mounted on the flow conduits so that the distances from the axis about which the flow conduits are driven in oscillation to the points where the beam structures are mounted to the flow conduits are equal. Further, the total masses of each beam structure with its attachments are equal so that a combination of equal masses and equal moment arms results in equal but opposite forces being generated at the base of the oscillating flow conduits.

By a unique sensor system design, the positioning of the masses of the components for not only the drive mechanism and beam structure but also the sensor systems can be distributed so that when mounted on a flow conduit the center of gravity of the beam structure with its affixed components is essentially located on the axis about which Coriolis forces distort the flow conduit. So configuring flow conduits and associated components for the drive mechanism, sensor systems and their mounting hardware assures maximum distortion of the flow conduit by generated Coriolis forces at the sensor system locations and minimum distortions caused by torques resulting from the configuration for mounting attachments to the flow conduits. This minimization of error inducing distortions results from the center of gravity for the attachments to the flow conduits being essentially located on the axes about which the generated Coriolis forces distort the flow conduit. Accordingly, no moment is provided for generating torques caused by the masses attached to oscillating flow conduits.

In addition to locating the centers of gravity for attachments to flow conduits on the axes about which the generated Coriolis forces distort the flow conduits, the rotational inertias for the attachments are selected so that the resonant frequency about the axes which the generated Coriolis forces acts is both higher and not a harmonic of the resonant frequency about the axes which the conduits are driven in oscillation.

Such mounting on flow conduits of drive mechanism components and sensor system components has improved the zero stability of Coriolis mass flow rate instruments by a factor of ten.

BRIEF DESCRIPTION OF THE DRAWINGS

In the drawings:

FIG. 3 is a sectional view of a velocity sensor according to the present invention;

Corresponding components are designated by the same

DETAILED DESCRIPTION OF THE INVENTION

Figure 1:
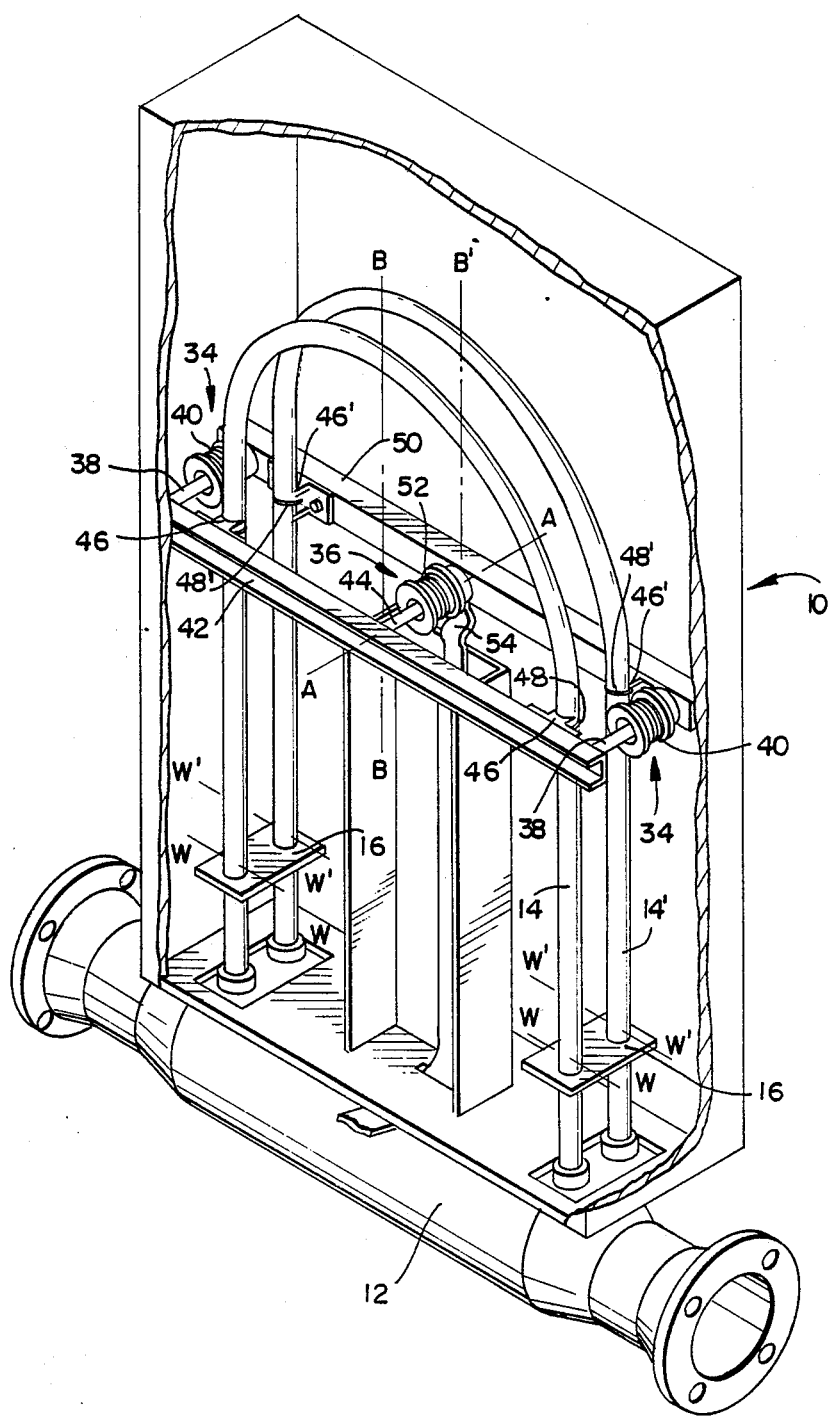
FIG. 1 is a perspective view of a Coriolis mass flow rate meter according to the present invention.

Referring now to the drawings, a Coriolis mass flow rate instrument according to the invention is illustrated in FIG. 1 where it is generally designated by reference numeral 10. Measuring device 10 includes pipe 12 from which two curved flow conduits 14 and 14' are cantilever mounted in substantially parallel fashion. Both flow conduits 14 and 14' are fabricated from continuous tubing and are free of pressure sensitive joints. Fixedly attached to both flow conduits 14 and 14' are supports 16 which in combination with pipe 12 provide a cantilever mounting for flow conduits 14 and 14'. The flow conduits 14 and 14' are selected and mounted so as to have substantially the same rotational inertia and the same spring constants about oscillation axes, W—W and W'—W', which are located substantially about supports 16. Since the flow conduits 14 and 14' are cantilever mounted in an essentially parallel fashion with free ends and have substantially equal rotational inertias and equal spring constants about their respective oscillation axes, W—W and W'—W', these flow conduits, 14 and 14', can be driven in opposition with respect to each other about these oscillation axes, W—W and W'—W', at essentially the same resonant frequency so as to function as the tines of a tuning fork.

Also necessary for the function of a Coriolis mass flow rate instrument is a mechanism for driving the flow conduits 14 and 14' in an oscillatory fashion and sensor systems for measuring the effects caused by generated Coriolis forces. Both the drive mechanism and the sensor systems, preferably velocity sensors, can be configured using permanent magnets positioned adjacent coils of wire (See U.S. Pat. Nos. 4,422,338 and 4,491,025).

Figure 2:
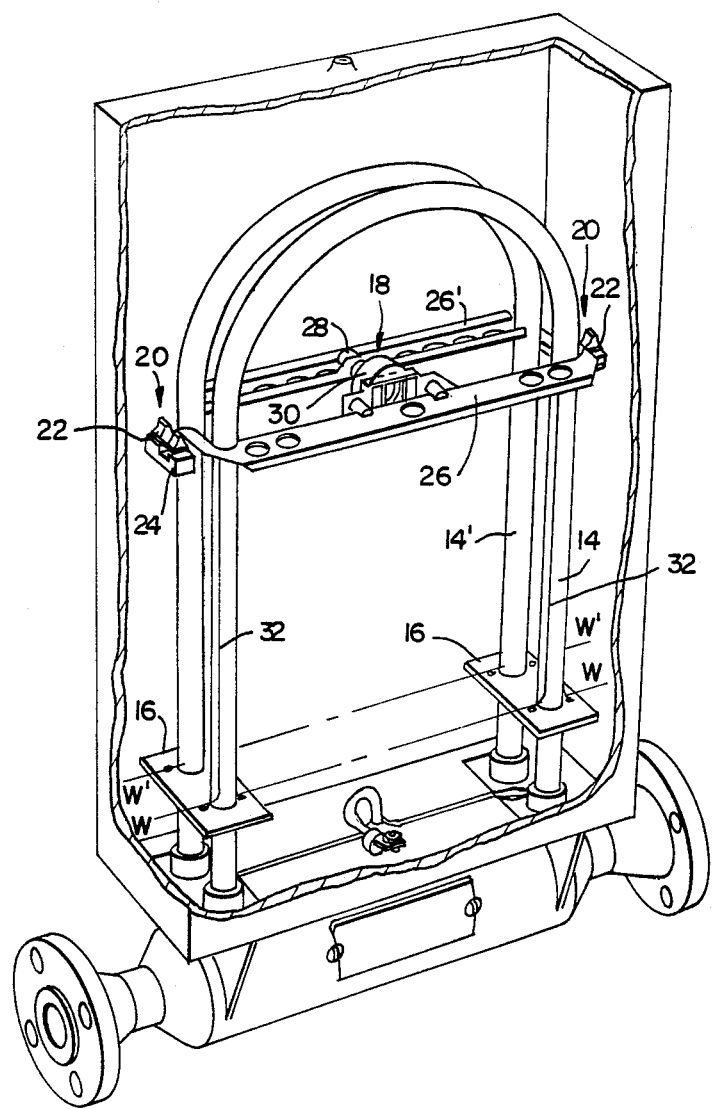
FIG. 2 is a perspective view of a Coriolis mass flow rate meter as previously known in the art.

A previously known arrangement for mounting a drive mechanism 18 and a set of velocity sensors 20 is shown in FIG. 2. The velocity sensors 20 as shown in FIG. 2, include coils 22 and horseshoe magnets 24 which are configured with respect to each other so that the coils 22 move within essentially uniform magnetic fields produced at both pole faces of the magnets 24 when the flow conduits 14 and 14' are driven in oscillation by drive mechanism 18. The velocity sensors 20 and the drive mechanism 18 are attached to flow conduits 14 and 14' by mounting the various components to the beams 26 and 26' and then attaching the beams 26 and 26' to the flow conduits 14 and 14'. The beams 26 and 26' are mounted on the flow conduits 14 and 14' at equal distances from their respective oscillation axes, W—W and W'—W', however, because the horseshoe magnets 24 for velocity sensors 20 are mounted closer to their oscillation axis W'—W' than are the coils 22 the centers of gravity for the horseshoe magnets 24 and the coils 22 are substantially displaced from having equal distances to their oscillation axes, W'—W' and W—W. This displacement of the centers of gravity and the inherent mass differences between horseshoe magnets 24 and coils 22 results in rotational inertias for velocity sensors 20 which accordingly produce different rotational inertias for flow conduits 14 and 14' that cause flow conduits 14 and 14' to be dynamically unbalanced. Aggregate differences in rotational inertias for the magnets 24, coils 22, drive mechanism 18 with its magnet 28 and coil 30, and beams 26 and 26' can be somewhat reduced, for this configuration, by designing the mass of beam 26 with the masses of coils 22 and 30 to be essentially equal to the mass of beam 26' with the masses of magnets 24 and 28. However, because of the mounting configuration for velocity sensors 20 the center of gravity of beam 26' with its attached coils 22 and 30 is further displaced from its oscillation axis W—W than is the center of gravity of beam 26' with its attached magnets 24 and 28 from oscillation axis W'—W'. With equal masses but different distances from their oscillation axes rotational inertia differences will therefore still exist between flow conduit 14 with attached beam 26 and flow conduit 14' with its beam 26'.

Additionally, degrading the dynamic equivalence of flow conduits 14 and 14' in the meter shown in FIG. 2 is the affixing of wires 32 to flow conduit 14 to provide electrical energy to the coil 30 of drive mechanism 18 and to transmit signals from the coils 22 of the velocity sensors 20. The affixing of wires 32 to flow conduit 14 invariably alters the dynamics of flow conduit 14 to be different from flow conduit 14'.

The configuration for a drive mechanism 36 and unique velocity sensors 34, and their attachment to flow conduits 14 and 14' in accordance with the present invention is shown in FIG. 1. The new velocity sensors 34 and their mounting overcomes the dynamic deficiencies of the embodiment in FIG. 2 and results in the rotational inertia for both flow conduits 14 and 14' with respect to the oscillation axes, W—W and W'—W', to be essentially equal and therefore the dynamics of flow conduits 14 and 14' to be essentially equal.

To insure the dynamic balancing of the Coriolis mass flow rate meter 10 shown in FIG. 1 the velocity sensors 34 are configured so as to have essentially equal masses for the magnets 38 and the coils 40, and to have the aggregate centers of gravity for the magnets 38 and the coils 40, when mounted on the flow conduits 14 and 14' to be at essentially the same distances from the oscillation axes, W—W and W'—W', and to be located on the axes, B—B and B'—B', about which the Coriolis forces act. The configuration for velocity sensors 34 is shown in FIG. 3. Instead of using a horseshoe magnet, the velocity sensors 34 of the preferred embodiment of the present invention uses a bar magnet 38 which is mounted so that the magnetic field of only one pole interacts with the coil 40. To assure, as required for velocity sensors 34 for Coriolis mass flow rate meters of the present invention, that the coils 40, when flow conduits 14 and 14' are oscillated, only intersect an essentially uniform magnetic field generated by magnets 38, the diameter of magnets 38, i.e., d, can be designed to be no more than one half the diameter of the open interior of coils 40, i.e., D, and preferably this relationship is less than one half. Further the relative movement of magnets 38 with respect to coils 40, as caused by oscillation of flow conduits 14 and 14' and Coriolis force induced distortion, can be designed to be one half or less than the longitudinal extent, i.e., x, of the windings 41 of coils 40.

With the above configuration for velocity sensors 34 a beam 42 can be assembled with bar magnets 38 for velocity sensors 34 affixed at each end of the beam 42. At the center of the beam 42 a third bar magnet 44 for drive mechanism 36 is affixed. The beam 42 is then attached to a first flow conduit 14 so that the distances from the oscillation axis, W—W, to the sections of flow conduit 14 where the beam 42 is attached to flow conduit 14 are essentially equal. Semi-circular supports 46 and threaded U rings 48 are used to attach beam 42 to flow conduit 14. The semi-circular supports 46 are designed so as to maintain the distance of the beam 42 from the flow conduit 14 such that the center of gravity for the aggregate configuration of the beam 42 and the attached magnets 38 and 44, is located along the central axis, A—A of drive mechanism 36, and is also positioned on the axis, B—B (see FIG. 1), about which Coriolis forces generated by the combination of oscillating flow conduit 14 about the oscillation axis, W—W, and flowing a substance through flow conduit 14 act. This assures that the combination of the rotational inertias resulting from oscillation of flow conduit 14 with the affixed beam 42 and its attachments generate no torques which introduce errors into the measurement of the Coriolis forces acting on flow conduit 14.

A second beam 50 can also be assembled in accordance with the above described configuration for velocity sensors 34 where the coils 40 for velocity sensors 34 are affixed at each end of the beam 50. At the center of the beam 50 a third coil 52 for drive mechanism 36 is affixed. The beam 50 is then attached to a second flow conduit 14' so that the distances from the oscillation axis, W'—W', to the sections of flow conduit 14' where the beam 50 is attached to flow conduit 14' are essentially equal. Semi-circular supports 46' and threaded U rings 48' are used to attach the beam 50 to the flow conduit 14'. The semi-circular supports 46' are designed so as to maintain the distance of the beam 50 from the flow conduit 14' such that the center of gravity for the aggregate configuration of the beam 50 and the attached coils 40 and 52, is located along the central axis, A—A, of drive mechanism 36, and is also positioned on the axis, B'—B' (see FIG. 1), about which Coriolis forces generated by the combination of oscillating flow conduit 14' about the oscillation axis, W'—W', and flowing a substance through flow conduit 14' act. This assures that the combination of the rotational inertias resulting from oscillation of flow conduit 14' for the beam 50 and its attachments generate no torques which introduce errors into the measurement of the Coriolis forces acting on flow conduit 14'.

Velocity sensors configured about horseshoe magnets where both pole faces are used can be mounted in conformity with the present invention if the masses of the magnets and the coils are equal and if the centers of gravity for both the first beam 42 and the second beam 50 with these attachments are located on the respective axes, B—B and B'—B', about which generated Coriolis forces act.

The distances from the axes, B—B and B'—B', about which the generated Coriolis forces act to the coils 40 and magnets 38 for velocity sensors 34 mounted on the beams, 42 and 50, are selected so that the rotational inertias for the attachments to flow conduits 14 and 14' maintains the resonant frequency of the flow conduits 14 and 14' at a higher value than the resonant frequency about the oscillation axes, W—W and W'—W', but not in a harmonic relationship. A harmonic relationship for these two resonant frequencies results in a synchronous sampling of errors which causes zero shift, while a non-harmonic relationship results in random sampling and therefore a nulling of error signals over a finite number of samplings.

Figure 4:
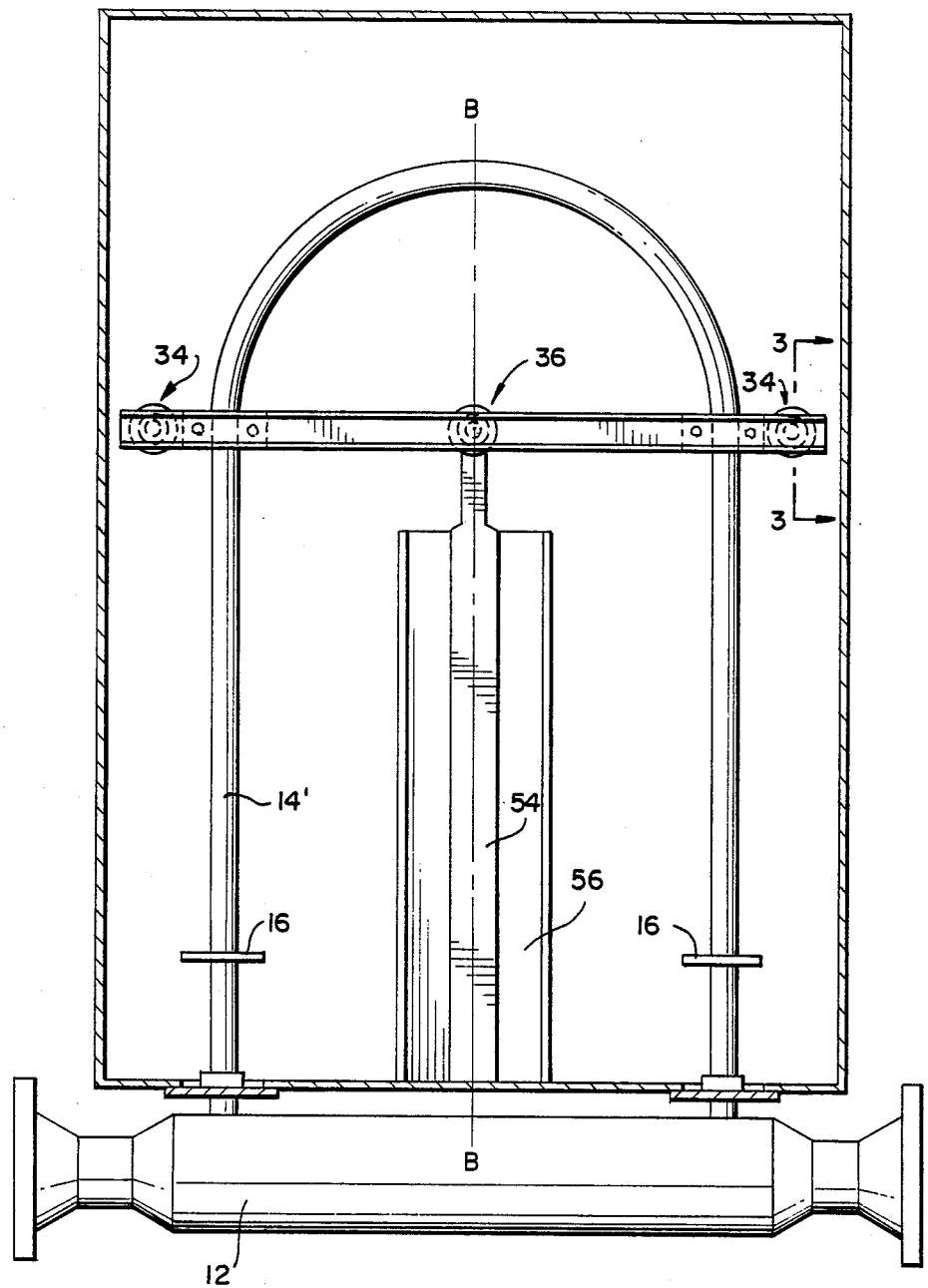
FIG. 4 is a front plan view of a Coriolis mass flow rate meter according to the present invention; and, FIG. 5 is a side plan view of a Coriolis mass flow rate meter according to the present invention.

A further requirement for coils 40 and 52 mounted on beam 50 is the necessity to provide electrical current to the coil 52 of drive mechanism 36 and to transmit signals from the coils 40 of velocity sensors 34. For the preferred embodiment a flat flexible ribbon 54 with multiple electrical conductors as known in the art is used. The flat flexible ribbon 54 is supported by a beam 56 so that the flat flexible ribbon 54 can be attached to the beam 50 at the location of the drive mechanism 36 coil 52. The flat flexible ribbon 54 is oriented with respect to the beam 50 so that as the flow conduit 14' is oscillated the flat flexible ribbon introduces minimum drag on the flow conduit 14'. Minimizing drag is assured by having the flat flexible ribbon 54 not mounted in a straight line configuration from the beam 56 to the drive mechanism 36 but in a loop so as to be free to oscillate with the flow conduit 14', see FIG. 5. Further the attachment of the flat flexible ribbon 54 to the beam 50 at the location of the central coil 52 assures that the central axis of the flat flexible ribbon 54 lies essentially coincident with the axis, B—B (see FIG. 4), of flow conduit 14' about which Coriolis forces act so that the contribution of torques from the flat flexible ribbon 54 are minimized.

The above discussion and related illustrations of the present invention are directed primarily to preferred embodiments and practices of the invention. Numerous changes and modifications in the actual implementation of the concepts described herein will be apparent to those skilled in the art, and it is contemplated that such changes and modifications may be made without departing from the scope of the invention as defined by the following claims.

What is claimed is:

1. An apparatus for measuring the mass flow rate of a fluid having two flow conduits, each mounted for oscillation about an axis, of a length of each of said flow conduits through which the fluid to be measured is flowed, comprising:
(A) a first sensor means for detecting Coriolis force induced distortions of said flow conduits, said first sensor means having at least two sensor means components, said first sensor means components having essentially equal masses;
(B) a second sensor means for detecting Coriolis force induced distortions of said flow conduits, said second sensor means having at least two sensor means components, said second sensor means components having essentially equal masses;
(C) a first beam to which are attached at opposite ends a first sensor means component and a second sensor means component;

(D) a second beam, said beam having a mass essentially equal to that of said first beam, to which are attached at opposite ends of said second beam a first sensor means component and a second sensor means component;

(E) means for attaching said first beam to a first flow conduit so that the locations where said first beam is attached to said first flow conduit are at essentially equal first distances from the axis about which said first flow conduit is oscillated, and for attaching said first beam to said first flow conduit so that the center of gravity of said first beam in combination with said first and second sensor means components is essentially positioned on the axis about which generated Coriolis forces act; and (F) means for attaching said second beam to a second flow conduit so that the locations where said second beam is attached to said second flow conduit are at essentially equal second distances from the axis about which said second flow conduit is oscillated, said first distances and said second distances being essentially equal, and for attaching said second beam to said second flow conduit so that the center of gravity of said second beam in combination with said first and second sensor means components is essentially positioned on the axis about which generated Coriolis forces act.

2. An apparatus as set forth in claim 1 in which a drive coil is attached in the middle of said first beam so that the center of gravity of said first beam in combination with said first and second sensor means components and said drive coil is essentially positioned on the axis about which generated Coriolis forces act, and a drive magnet, having a mass essentially equal to the mass of said drive coil, is attached in the middle of said second beam so that the center of gravity of said second beam in combination with said first and second sensor means components and said drive magnet is essentially positioned on the axis about which generated Coriolis forces act.

3. An apparatus as set forth in claim 1 in which said first sensor means includes a first sensor magnet and a first sensor coil, said first sensor coil and said first sensor magnet having essentially equal masses; and, said second sensor means includes a second sensor magnet and a second sensor coil, said second sensor coil and said second sensor magnet having essentially equal masses.

4. An apparatus as set forth in claim 3 in which only one pole of a sensor magnet enters a sensor coil and generates an electrical signal in said sensor coil.

5. An apparatus as set forth in claim 1 in which the locations of said first and second sensor means components are selected on both said first and second beams so that the resonant frequency of said first and second flow conduits about the axes where generated Coriolis forces act is higher than, and not a harmonic of, the resonant frequency of the axes about which said first and second flow conduits are driven in oscillation.

6. An apparatus as set forth in claim 4 in which the diameter of said sensor magnet is no more than one half the inside diameter of said sensor coil and the relative movement of said sensor magnet with respect to said sensor coil is no more than one half the longitudinal distance of said sensor coil.

7. In a method for constructing an apparatus for measuring the mass flow rate of a fluid comprising (1) two sensor systems each consisting essentially of two sensor components for detecting Coriolis forces and (2) two flow conduits, mounted to permit a length thereof to oscillate (a) about an axis for said flow conduit and (b) as one tine of a tuning fork in cooperation with the other flow conduit, the improvement which comprises mounting one of the two sensor components from both sensor systems on each of two beam structures and attaching one of the resulting beam structures with two sensor components mounted thereon to each of said flow conduits in a manner such that the aggregate center of gravity of each beam structure with mounted sensor components thereon lies (i) at an equal distance from the axis about which a length of the attached conduit oscillates and (ii) essentially on the axis of the attached flow conduit about which generated Coriolis forces act when fluid is flowing through the conduit.

* * * * *